March 21, 1944.  C. R. LANDIS ET AL  2,344,823
X-RAY PHOTOGRAPH MARKING, AND METHOD, AND MEANS OF MAKING SAME
Filed July 21, 1941  2 Sheets-Sheet 1
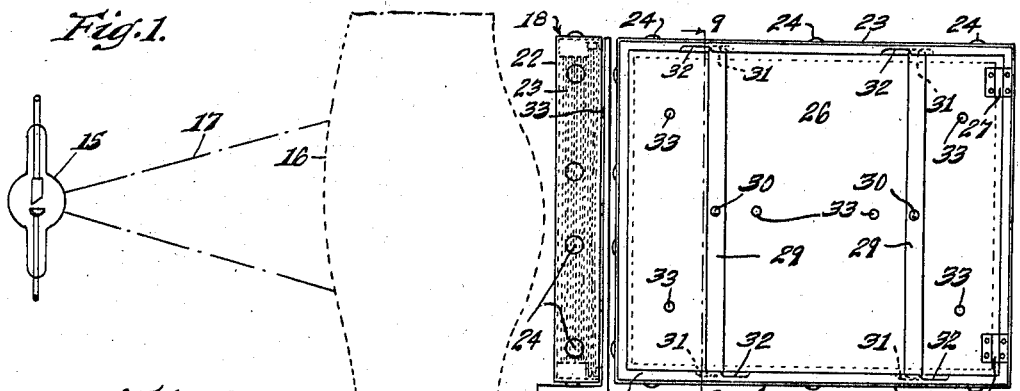
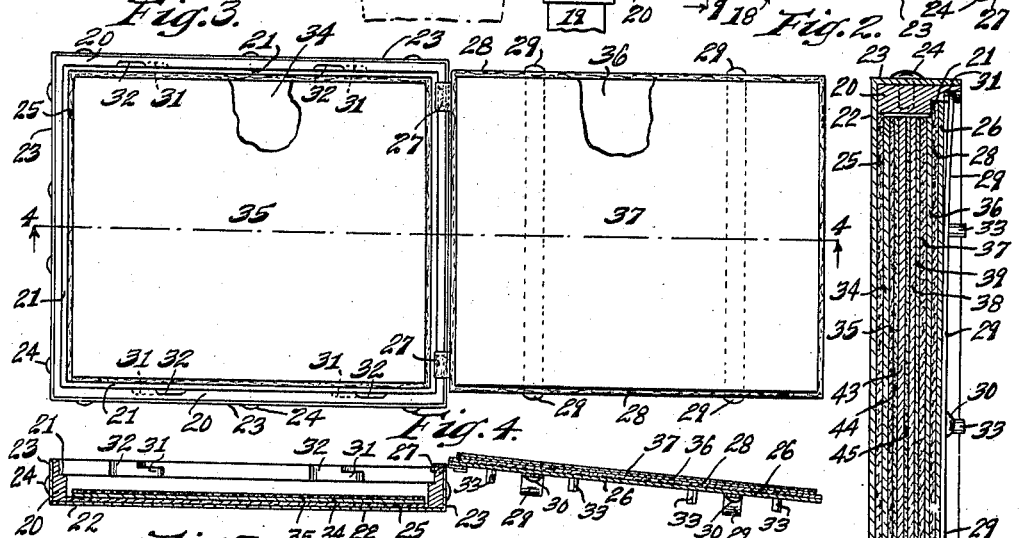
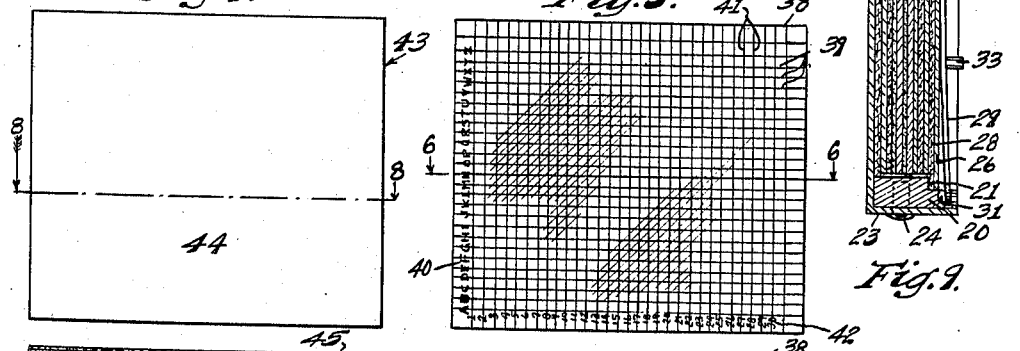
Witnesses:
E. E. Wessels
Aasta E. Metzen
Inventors;
Clyde R. Landis,
And William L. Culpepper,
By Joshua R H Potts
their Attorney.

March 21, 1944. C. R. LANDIS ET AL 2,344,823
X-RAY PHOTOGRAPH MARKING, AND METHOD, AND MEANS OF MAKING SAME
Filed July 21, 1941 2 Sheets-Sheet 2
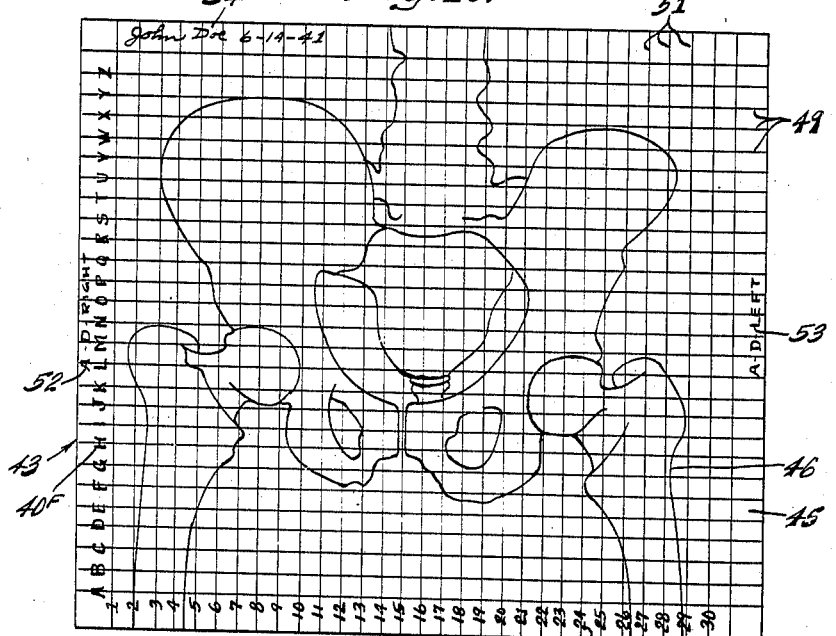
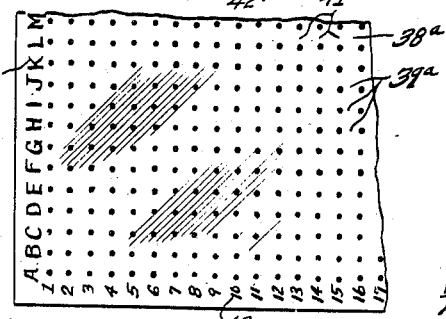
Inventors:
Clyde R. Landis,
William L. Culpepper,
BY Joshua R H Potts
Their Attorney.
Witnesses:
E. E. Wessels
Aasta E. Matson Patented Mar. 21, 1944

2,344,823

UNITED STATES PATENT OFFICE 2,344,823

X-RAY PHOTOGRAPH MARKING, AND METHOD AND MEANS OF MAKING SAME

Clyde R. Landis and William L. Culpepper, Chicago, Ill., assignors to Don B. McCloud, Du Quoin, Ill.

Application July 21, 1941, Serial No. 403,268

9 Claims. (Cl. 250—65)

This invention relates to improvements in X-ray photographs, a method of marking, and method and means of making the same.

The invention also relates to a new method of marking X-ray photographs or pictures, technically known as radiographs or roentgenograms, in such a way that an alinement or the misalinement of certain bony structures of the body and their spaced relationships to each other can be quickly and accurately determined and measured, and the object thereof is to so mark the film or photograph with readily visible coordinate horizontal and vertical markings, divisions or lines so that there will be no hiatus or broken lines in the image at the markings to appear as a break or defect such as in bones, but a continuous and unbroken image where the markings or lines intersect therewith or cross the same. This is done by producing on the film easily discernible vertical and horizontal markings, such as lines or dots equally distanced apart in the manner of cross section paper, such lines, however, being so produced and of such nature that they do not obliterate the details of the objects that appear in the picture.

In the past, efforts have been made to produce cross-section markings on a radiograph by interposing an impermeably formed grid or screen between the source of X-rays and the sensitized film, such grids or screens being made of materials impervious to X-rays and placed adjacent or some distance from the sensitized surface of the film. Results with such devices are unsatisfactory because the lines produced are blurred, sometimes distorted, and the image of the object shown on the radiograph is not clearly discernible at lined intersections because there is no image at such points and therefore appears as if broken or fractured, due to the breaks or hiatuses at such points.

The technique made possible by this invention does not require anything to be interposed between the X-rays and the sensitized film in addition to the body to be X-rayed and an intensifying screen. The marking device is placed on one side of, adjacent, in back of or in direct contact with the film. The lines produced while easily discernible, do not obliterate the details of the image of any object appearing on the film, yet the lines are sharply defined without any distortion in spacing due to the sheet of the marker except preferably the marking thereon being in intimate direct contact with the sensitized surface of the film.

In the past the practice in taking radiographs or X-ray pictures consisted of exposing the sensitized surface of a film or plate to the direct emanation of X-rays. The sensitized surface of a film or plate consists of a layer of emulsion containing certain silver compounds which are affected chemically by X-rays and more strongly affected by light rays. Formerly this emulsion was applied to only one surface of a film or plate. In modern practice, however, both surfaces of a film are coated with this sensitized emulsion and a picture is actually described or produced on each of these surfaces so that the present day radiograph may be said to consist of two facsimile pictures exactly superimposed one on the other, separated by the cellulose non-sensitive portion of the film itself. By means of this invention it is possible to produce marking lines on only one surface of the film leaving the opposite surface of the film unmarked and the image thereon complete in every detail and discernible even where the marking lines cross the same. This makes the lines discernible without obliterating the image photographed.

Films having both surfaces covered with sensitized emulsion are commonly known as "dupletized" films and a radiograph made on such a film ordinarily is produced by the use of intensifying screens. The technique involves placing such a film in a holder commonly known as a cassette. The cassette or film holder usually has a Bakelite or aluminum front and a removable or hinged back cover of metal such as aluminum, with means for holding the same in place or closed. It is lined front and back by intensifying screens that generate light by the impact of X-rays upon the calcium tungstate or other material in or coating of the screens. In practice a film is placed within a cassette in contact with the front intensifying screen after which the cover or back is closed or placed upon the cassette bringing the intensifying screen attached to the cover in direct contact with the opposite side of the film. The cover is then clamped in place which presses the film between the two screens. The object to be photographed is then placed between the source of X-rays and the cassette. When the X-rays are focussed upon the cassette the intensifying screens immediately emanate light which persists until or for a short interval of time after the X-rays are discontinued. The sensitized surfaces of the film are susceptible both to X-rays and light rays, therefore the image on these surfaces of the film is obtained by two stimuli, first the direct X-rays and secondly the light generated by the intensifying screens. It is estimated that approximately eighty per cent of the photographic changes that take place on the sensitized surfaces of the film are due to the light from the intensifying screens and only about twenty per cent due to the direct X-ray emanations.

The intensifying screen on the front part of the cassette affects principally the emulsion on the surface of the film with which it is in contact. The light from the intensifying screen on the back of the cassette affects principally the emulsion on the opposite side of the film.

In order to produce discernible lines on one of the sensitized surfaces of the film, the present invention provides a marker to be placed between the sensitized film and one of the intensifying screens used in the cassette. This marker consists of lines drawn with India ink or any other opaque material, pigment or liquid on a sheet of extremely thin transparent material such as Cellophane. The lines on the marker should be permeable by X-rays but fairly or substantially impermeable to ordinary light rays. Thus, when a marker of this sort is interposed between one of the screens, preferably at the back and the sensitized film, both screens and the film are exposed to the X-ray emanations exactly as they would be if the marker were not used because neither the Cellophane sheet nor the lines thereon constitute a barrier or screen for the X-rays, both being easily penetrable by such rays. The secondary light produced by the intensifying screens however does not have the penetrating power of X-rays and the lines on the marker, opaque to ordinary light, will cause shadows from the secondary light emanations producing easily discernible substantially transparent lines on the sensitized surface of the film to which the marker is adjacent. The other sensitized surface of the film is practically unaffected by this marker since the entire and complete image is produced thereon even at said lines or other markings and readily distinguishable therefrom especially at the points of crossing or intersections therewith.

In making a film marker in accordance with the present invention a piece of ordinary transparent Cellophane is preferably cut slightly smaller than the intensifying screen on one side, preferably the cover of the cassette, after which horizontal and vertical intersecting coordinate markings or lines ruled or produced in any other suitable way on the Cellophane sheet using any opaque marking material, pigment or pencil, such as carbon or India ink and an ordinary drawing pen. After the ink is dried it is good practice to glue this marker to the intensifying screen on either the front or cover of the cassette by means of four small supports of ordinary photographer's paste, one on each corner. Then, when a "dupletized" duplex or double-coated film is placed in the cassette and the cover clamped in place one sensitized surface of the film will bear directly upon one of the intensifying screens whereas the opposite sensitized surface of the film will be in direct contact with the marker which, in turn, is in contact with the other intensifying screen.

Upon exposure to X-rays in accordance with the general practice the X-ray emanations are turned on for a few seconds depending upon the nature of the object to be photographed. Both intensifying screens and both the surfaces of the film are exposed to the full force of these X-rays because the marker does not constitute a barrier to these rays. The impact of the X-rays upon the intensifying screens immediately causes them to emanate light or light rays in accordance with the X-ray stimulus. These light emanations or rays affect the sensitized surfaces of the film perhaps five or ten times as much as do the direct X-rays. The light coming from the intensifying screen in contact with the film produces the complete picture of the object on the sensitized surface which it contacts. The light from the other intensifying screen that is separated from the other sensitized surface of the film by the marker passes through the transparent part of the marker but is blocked by the opaque markings such as the lines of ink or dots on the marker. These lines therefore appear upon the developed negative or film as being transparent.

As before stated, the "dupletized" oppositely or double coated film actually consists of two facsimile pictures exactly superimposed but separated by the cellulose body of the film except that the picture or image on one side is intersected by the markings.

One side of the developed film exposed as hereinbefore described, has the complete picture, the other side a like picture divided into square segments by transparent lines. The two pictures are exactly superimposed on opposite surfaces of the single film. Where there are no lines the objects appear just as they do on any standard "dupletized" film, but where the lines occur the images are only of approximately half the intensity because such images come from or are produced on only one side of the film by both rays, the other side at the lines or markings being a clear line except possibly that portion developed by exposure to the X-rays. Thus, this invention makes it possible to produce discernible markings or cross-section lines on one surface of a film with or without a complete picture produced by the X-rays only exclusive of the light rays of the intensifying screen on that side, and at the same time have the other surface of the film contain the complete unmarked picture produced by both the X-rays and light rays from the intensifying screen on the other side.

The value of marked films of this nature is apparent to an anatomist looking at the bony structure of the human body from a so to speak mechanical standpoint in determining the condition thereof. We find that it consists of numerous parts or bones held together by various types of joints and other connection media and the entire body is mechanically supported by this structure. Certain parts of this structure are normally symmetrical. If a mis-alinement occurs it sometimes cannot be discovered unless it is carefully compared with the placement of a similar member on the opposite side of the body. There are wide variations of the exact placement of bones in different individuals. Consequently, careful imperative, accurate measurements are frequently necessary in order to determine whether or not certain misplacements have occurred and corrections necessary. By means of a radiograph or X-ray picture marked with cross-section markings or lines, say one-half inch or other suitable distance apart, it is a simple matter to check one structure with its companion structure on the opposite side of the body and readily and accurately determine the degree of deviation from normal relation or condition and relative mis-alinement or misplacement, so that correction or proper treatment can be given the patient. Such markings on the film however should not be of a type that would obliterate completely any part of the image.

Further objects and advantages will appear and be brought out more fully in the following specification, reference being had to the accompanying drawings, in which:

Fig. 1 is a diagrammatic side view with the cassette in end elevation and showing the method of producing an X-ray photograph and marking the same;

Fig. 2 is a rear elevation of the cassette;

Fig. 3 is an elevation of the cassette opened and showing the intensifying screens in position before the marking sheet and film are placed in position;

Fig. 4 is a section taken on the line 4—4 of Fig. 3;

Fig. 5 is an elevation of the marking sheet;

Fig. 6 is a section of the marking sheet taken on the line 6—6 of Fig. 5;

Fig. 7 is an elevation of the film;

Fig. 8 is a section of the film taken on the line 8—8 of Fig. 7;

Fig. 9 is an enlarged vertical section taken on the line 9—9 of Fig. 2;

Fig. 10 is an enlarged face view of the developed film or negative photograph and looking toward the side having the markings thereon;

Fig. 11 is a view of a fragmentary portion of the developed film or picture, greatly enlarged;

Fig. 12 is a fragmentary elevation of a modified form of marking sheet; and

Fig. 13 is a fragmentary elevation of a film marked by the sheet shown in Fig. 12.

Referring more particularly to the drawings to illustrate the construction and operation of the invention 15 designates an X-ray, Roentgen or Crookes lamp or tube or other source of X-rays which is suitably supported for adjustment in the usual way not necessary to be described herein and adapted for taking pictures of bodies arranged vertically or upright, or horizontally or in a reclining position. As indicated, 16 represents the mid-section of a body with a person standing in an erect position but it is to be understood that any other part of the body or any other object may be employed with equal facility. The X-rays are generally designated at 17 the body being interposed between the lamp and the frame or cassette 18 in which the film is held during the taking of the picture. The cassette may be supported upon suitable means such as represented at 19 with the cassette arranged vertically or horizontally and illustrated in the form shown as being arranged vertically with a suitable upright at the back. This cassette consists of a rectangular frame 20 of some metal such as aluminum or even Bakelite which the X-rays will penetrate and is shown of L-shaped cross-section or rabbeted to form a seat as indicated at 21. The front is closed by a plate 22 which may also be of aluminum or Bakelite or other material permeable to the X-rays. This plate is shown flanged at 23 around the frame 20, being flanged over all four sides thereof and suitably fastened by pins or other fastenings indicated at 24. On the inside of the front wall or plate 22 is a cloth or felt cushion lining 25, usually black or dark the purpose of which will be hereinafter made apparent. 26 designates a back cover which is removable or movable as by hinging the same to the frame 20 through the medium of hinges 27. This back plate or cover may be provided with a cloth or felt cushion lining 28, usually white, both linings forming pads. While the particular construction of this cassette forms no part of the present invention and therefore may take any of the forms usual in the art, the same has been described in order to obtain a better understanding of the present invention and the method of marking films and the operation thereof. As shown, suitable means are provided to hold the back or cover 26 closed, such means being illustrated in the form of spring holding means or fasteners in the form of bowed springs 29 pivoted to the cover as at 30 and having the ends thereof adapted to be bent down to enter grooves 31 in the inner faces of the sides of the frame 20 by passing the same through recesses 32 also located in said sides and communicating with the grooves but arranged in diagonally opposite positions at opposite sides of the frame and opposite ends of the respective grooves opposing each other at opposite sides of the frame. Of course, any other holding means may be employed. Buttons or spacing pins 33 may also be provided at the back so as to engage the upright portion of the support means 19, said buttons or pins projecting from the back plate or cover or provided for any other purpose desired. The felt lining or pad 25 on the inside of the front wall or plate 22 receives an intensifying screen 34 which is usually a fibrous or paper body coated with calcium tungstate or some other fluorescent coating 35 which when impacted with X-rays will give off light. This may be suitably fastened to the lining 25 in a centered position in any suitable way by photographer's paste, glue, or otherwise. A similar screen 36 is likewise attached to the lining or pad 28 carried by the back plate or cover 26 and has a similar coating 37, both coatings or the active sides of the intensifying screens facing inwardly or toward each other. Fig. 1 shows the cassette closed in side elevation and Fig. 2 looking at the back thereof, while Figs. 3 and 4 show the cassette open. In order to mark the film, a marking medium shown in the form of a sheet 38 as illustrated in Figs. 5 and 6 of the drawings is employed. This sheet is preferably cut smaller than the screen 36 and may be made of some material permeable to both X-rays and light rays such as a transparency of Cellophane, glass or the like having produced thereon suitable markings shown in the form of horizontal parallel lines 39 designated along one or more margins by suitable characters such as from A to Z designated at 40. The marking medium or sheet is also provided with parallel vertical lines 41 designated by numbers from 1 to 30 or otherwise as indicated at 42, these coordinate lines intersecting each other at right angles and spaced one-half inch apart or otherwise according to the size of the X-ray photograph to be produced or the particular object being pictured and producing squares of similar size. The supporting or carrying medium for the lines may be any transparency so long as the lines or markings are opaque to ordinary light rays but such as to pass X-rays and may be broken or dotted lines if desired. They are preferably produced on the sheet with ordinary carbon or india ink or other suitable pigment, pencil or marking material and the medial lines may be identified as desired. As represented in Fig. 9 of the drawings, this marking sheet or medium is placed against one of the intensifying screens and preferably against the intensifying surface 37 of the screen 36 attached to the cover 26 with the marked side toward the screen, especially where the sheet is extremely thin such as of Cellophane. This is not essential as the markings may be on the opposite side, the main idea being that the markings will be protected from wear or marring. It is attached at the corners or other suitable places to the sensitized screen by photographer's paste or otherwise.

The ordinary double coated or "dupletized" film is designated at 43, the same being normally light yellow, ochre or cream color but dark or black when exposed and developed and having a base or cellulose portion or sheet in the center with sensitized gelatin coatings 44 and 45 on opposite sides. After the marking sheet is placed in position on one of the intensifying screens, the film 43 is placed in position in the cassette against this sheet or the other screen and the cassette is closed while the film is protected from exposure to light or active rays in a suitable dark room and the device is then ready for exposure to the X-rays in the manner shown in Fig. 1 of the drawings. The result will be a product as shown more particularly in Figs. 10 and 11 of the drawings representing the film developed with the picture or image in the form of a negative produced upon the sensitized coatings on opposite sides of the film to appear as a single image but in which actually one image is superimposed upon the other to produce a highly desirable and more readily discernible photograph.

The result is that the bone structure or object 16 will be produced upon the film in the form such as represented by the outline of the midriff or abdominal structure represented in Fig. 10 of the drawings in which the image is designated by the lines 46. This film is ordinarily black or dark as indicated by the lined portion 47 in Fig. 11 while the image portion 48 on both sides or sensitized coatings of the film are represented as being stippled to indicate the light or shaded portion of the image on the film. The horizontal markings or cross-section lines are designated at 49 as produced by the lines 39 on the marking sheet and 50 designates the image at points of intersection on one side of the film, preferably at the back where the lines intersect the image or representations of the bones and which is somewhat lighter than the portions 48. The vertical markings or transparent lines 51 produced by the vertical lines 41 intersect the lines 49 at right angles in the same relation as the cross-section or coordinate lines of the markings, medium or sheet and the stippling at the points of intersection of the lines with the image is made lighter to bring out the distinction between the same and points where no markings are produced but without disturbing the continuity of the image or outlines thereof.

In producing the image, the X-ray is turned on for a few seconds to direct the same or emanations therefrom toward the film through the body 16 and then the X-ray lamp is turned off. These rays impacting with the calcium tungstate or other luminescent coating of the intensifying screens causes the latter to give off light rays, one screen causing the same to be directed toward the film at one side in direct contact therewith while the rays on the other side are directed toward the film through the sheet the lines of which are opaque to ordinary light rays but permeable to X-rays so that the photographed image on the film is obtained by two stimuli, one being the direct X-rays and the other being the light generated in opposite directions by the intensifying screens. Since the X-rays only produce a minor portion or degree of development of the image on the film and the light rays from the screens produce the major portion thereof, the image will be fully developed on one side where there is no marking sheet or medium but on the opposite side where the marking sheet or medium such as the opaque lines is interposed between the screen and the film or the coating thereof at that side, the light rays from said screen will be prevented from passing to the film and the result is that the film will be undeveloped or unexposed to the light rays of said screen and the lines will be produced upon the sensitive coating at that side of the film in the form of transparencies which are readily visible upon viewing the film toward a light. Thus, the image will only be developed on this side at points not intersected by the markings but since the film has been partially developed by X-rays on both sides due to the markings being permeable to said X-rays and the image developed by the light rays from the intensifying screen on the side opposite the location of the markings, a complete image will be developed on one side and the light rays from the intensifying screen will develop the image at the portions not intersected by the markings on the side having the markings so as not only to produce the effect of two superimposed images but the continuity of the latter and the outlines thereof will be unbroken even at the markings thus rendering the reading more accurate and avoiding the appearance of breaks or fractures in the image or bone structure such as appears with the old method of marking.

From an observation of the X-ray picture outlined in Fig. 10 of the drawings, it will be seen that mis-alinements are readily discernible by comparison of parts of the image or bone structure with the calibrated or coordinate markings in this form shown as lines and reference may be had to the calibrations 40F and 42F or letters and numbers designating the different lines from A to Z, and 1 to 30, respectively, in describing a part or locating any mis-alinement and measuring the same. As represented, it will be noted that with a line extending medially and vertically of the spine structure, the ilium or upper part of the dorsal bone at the right hand side is approximately one-half inch higher than that at the left hand side. Markings 52 and 53 may be provided upon the film to indicate the right and left hand sides of the body and these may be produced in any suitable way, by the old method or by the method herein described through the medium of the marking sheet so that they will be depicted on the film in the manner illustrated. It will also be noted that other parts including the hip joints are correspondingly mis-alined not only as to height but also shifted to one side or to the right as indicated by the parting at the pelvic bones and thus a specialist may readily measure and determine the degree of mis-alinement and prescribe the necessary treatment for correction. Suitable data as indicated at 54 may be written with white ink or otherwise marked on the film to identify the person or object photographed, the date of the picture and any other suitable information.

In Figs. 12 and 13 of the drawings a modified form of marking is illustrated in which the transparent marking sheet 38a is the same except that instead of having the coordinate lines as shown and described in Figs. 5, 10 and 11, broken or dotted lines 39a and 41a are provided and produced by dots at the points of intersection of the rectangular or square divisions which would ordinarily be produced by the lines. In other words, the markings are simply dots at the corners of the squares and misalinement can be readily followed from such marking with less obscuring of the image on the film than results from solid lines or obliterating the image photographed. It is to be understood that the control of the X-rays, the duration of use thereof and the completion of the picture will be consequently hastened by the method herein described and yet produce very clear photographs or images on the film together with the markings for determining space relationships of bony structures of the body accurately and quickly. The method of developing will be the same as any well known method previously practiced.

Thus, instead of employing the old method of applying cross-section markings on a radiograph by interposing an impermeable screen between the source of X-rays and thus the body being X-rayed or photographed and the sensitized film using screens made of material impervious to X-rays such as grids with lead lines and placed adjacent to or some distance from the sensitized surface of the film with resulting unsatisfactory markings because the lines produced are blurred and the image of the object shown on the radiograph not discernible at all or clearly discernible at line intersections because the continuity of the image is entirely broken by the lines or other markings in view of the fact that no photograph or development of the image appears at such points, the present invention overcomes such objections and results in a much clearer image the continuity of the body and margins of which are entirely unbroken. The invention does not require the interposition of an X-ray impermeable marking between the source of the X-rays and the sensitized film and therefore the lines produced while easily discernible do not obliterate or cause breaks in the continuity of the body or margins but render the same continuous and the details of the image of any object are sharply defined due to the marker being in direct intimate contact with the sensitized surface of the film. While it is not new to use a film or plate coated on both sides with a layer of emulsion containing certain silver compounds or other sensitized coating and subjecting the same to the direct emanations of X-rays or using intensifying screens which act upon the sensitized surfaces of the film after the impact of the X-rays thereon, it is new to interpose a marking medium between a sensitized screen and a surface of a film so that the light rays from such screen thrown against the marking sheet with the markings thereon opaque, impervious or impermeable to the light rays from the screen, though permeable to the X-rays, to produce the markings on the film which appear substantially as transparencies on one side. The result is that the image developed by the X-ray on that side is partially visible in addition to the visibility of the image fully developed on the opposite side of the film and uninterrupted by any markings as produced both by the X-rays and the light rays from the sensitized screen at said side.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to secure by Letters Patent is:

1. A method of marking double coated films consisting in interposing the film between two intensifier screens adapted to give off light when impacted by X-rays through a body to be pictured and interposing between only one of the screens and the film a transparent marking sheet having intersecting vertical and horizontal markings thereon of an area to extend over the image pictured on the film produced by material pervious to X-rays but impervious to light rays from the screen whereby the image of the object produced will be produced upon both sides of the film by the X-rays, completely on one side by the light rays from the intensifier screen at that side and on the other side by the light rays from the other intensifier screen except at the interception of the light rays from said screen by the lines so as to produce lines on the film at said side only in the form of transparencies.

2. An X-ray film having a sensitive coating on both sides and superimposed images of the object produced on both of said sides by X-rays and light rays, the image on one side only as produced by the light rays at said side being intersected by transparent markings produced by material impermeable to light rays and interposed between the film and said light rays.

3. An X-ray film or photograph having sensitized coatings on both sides bearing an image of an object X-rayed, such as bone structure, and parallel lines normal to each other in the form of transparencies on one side only of the film superimposed over complete and partial development of the image to present an unbroken outline of the image between and at the line intersections.

4. A method of marking the entire object area of a film as used in making radiographs to determine alignment or misalignment and spaced relationship to each other of bone structure or parts of the object X-rayed consisting in interposing a film between a pair of sensitized screens, interposing between one side of the film and only one of the screens, a normally transparent sheet having coordinate lines thereon opaque to ordinary light rays but transparent to X-rays, over the image area, and exposing the same, whereby said lines will appear on the film over a partially developed image as transparencies.

5. A method of marking the entire object area of a film as used in making radiographs to determine alignment or misalignment and spaced relationship to each other of bone structure or parts of the object X-rayed consisting in interposing a film between a pair of sensitized screens, interposing between one side of the film and only one of the screens, coordinate lines opaque to ordinary light rays but transparent to X-rays, over the image area, and exposing the same, whereby said lines will appear on the film over a partially developed image as transparencies.

6. A method of marking an X-ray film over the entire area thereof, with coordinate lines appearing on one side only over the object pictured thereon, consisting of interposing a transparent marking medium in the form of a sheet of substantially the same size as the film, having coordinate lines thereon opaque to ordinary light rays and transparent to X-rays, between one side of the film and only one intensifying screen as used in X-raying an object wherein the film is interposed between two intensifying screens in a cassette, and leaving the opposite side of the film unobstructed to light rays from the other screen.

7. A duplex film having transparent markings thereon on one side only and intersecting at right angles over an image produced on the film, said markings consisting of intersecting lines and the image being complete at all points including the points of intersection, and visible in marked contrast to the lines at the points of intersection, whereby the image of the object photographed will be complete at all points.

8. A method of marking the image area of an X-ray film with coordinate transparent lines consisting in exposing to X-rays which have passed through the object being photographed, an assembly of said X-ray film, an intensifying screen and a marker interposed therebetween, said marker being adjacent a sensitized surface of said film and having over its surface adjacent said image area coordinate lines opaque to ordinary light but transparent to X-rays.

9. A method of marking the image area of an X-ray film with coordinate transparent lines consisting in exposing to X-rays which have passed through the object being photographed, an assembly of said X-ray film, an intensifying screen and a marker interposed therebetween, said marker being adjacent a sensitized surface of said film and having over its surface adjacent said image area coordinate lines opaque to ordinary light but transparent to X-rays, said lines intersecting each other at right-angles.

CLYDE R. LANDIS.
WILLIAM L. CULPEPPER.